United States Patent
Ross et al.

(10) Patent No.: US 11,356,524 B1
(45) Date of Patent: Jun. 7, 2022

(54) COORDINATING REQUESTS ACTIONED AT A SCALABLE APPLICATION

(71) Applicant: INTERNATIONAL BUSINESS MACHINES CORPORATION, Armonk, NY (US)

(72) Inventors: Martin A. Ross, Gosport (GB); Jack William Donato Evans, Rochester (GB); Jack Richard William Stevenson, Winchester (GB); Luke James Powlett, Henley-in-Arden (GB)

(73) Assignee: International Business Machines Corporation, Armonnk, NY (US)

( * ) Notice: Subject to any disclaimer, the term of this patent is extended or adjusted under 35 U.S.C. 154(b) by 0 days.

(21) Appl. No.: 17/247,615

(22) Filed: Dec. 18, 2020

(51) Int. Cl.
| | |
|---|---|
| G06F 9/54 | (2006.01) |
| G06F 7/00 | (2006.01) |
| G06F 16/27 | (2019.01) |
| G06F 16/20 | (2019.01) |
| H04L 67/561 | (2022.01) |
| H04L 67/01 | (2022.01) |
| H04L 67/143 | (2022.01) |
| H04L 67/5682 | (2022.01) |

(52) U.S. Cl.
CPC ........ *H04L 67/2804* (2013.01); *H04L 67/143* (2013.01); *H04L 67/2852* (2013.01); *H04L 67/42* (2013.01)

(58) Field of Classification Search
USPC ....... 709/224, 223, 203, 231, 212, 229, 248, 709/219, 226
See application file for complete search history.

(56) References Cited

U.S. PATENT DOCUMENTS

| | | |
|---|---|---|
| 6,889,254 B1 | 5/2005 | Chandra |
| 7,493,380 B2 | 2/2009 | Aman |

(Continued)

FOREIGN PATENT DOCUMENTS

WO 2021105851 A1 6/2021

OTHER PUBLICATIONS

International Searching Authority, "Notification of Transmittal of the international Search Report and the Written Opinion of the International Searching Authority, or Declaration," Patent Cooperation Treaty, Feb. 25, 2021, 11 pages, International Application No. PCT/IB2020/061039.

(Continued)

*Primary Examiner* — Jude Jean Gilles
(74) *Attorney, Agent, or Firm* — Elliot J. Shine

(57) ABSTRACT

A method, computer system, and a computer program product for coordinating requests actioned at a scalable application is provided. The present invention may include registering metadata regarding response behavior to be applied when actioning a client request to multiple application instances. The present invention may include augmenting a client request according to the metadata to provide augmented request instances to coordinate completion on a required number of response instances from the application instances to which the augmented request instances are routed. The present invention may include coordinating a status of the client request across the application instances to terminate outstanding augmented request instances when a required number of completed instances is received.

15 Claims, 7 Drawing Sheets

(56) References Cited

U.S. PATENT DOCUMENTS

| | | | |
|---|---|---|---|
| 7,647,329 B1* | 1/2010 | Fischman | G06F 3/0607 |
| | | | 707/999.1 |
| 9,239,851 B1 | 1/2016 | Messer | |
| 9,633,051 B1* | 4/2017 | Maccanti | G06F 11/1451 |
| 9,712,411 B2 | 7/2017 | Tseitlin | |
| 9,779,015 B1* | 10/2017 | Oikarinen | G06F 16/10 |
| 9,804,949 B2 | 10/2017 | Krajec | |
| 9,971,675 B2 | 5/2018 | Lincoln | |
| 10,178,031 B1 | 1/2019 | Krajec | |
| 10,642,663 B2 | 5/2020 | Harris | |
| 10,776,395 B2* | 9/2020 | Sivasubramanian | G06F 16/21 |
| 11,080,114 B2 | 8/2021 | Ross | |
| 2003/0023669 A1 | 1/2003 | DeLima | |
| 2005/0066327 A1 | 3/2005 | Dettinger | |
| 2006/0193263 A1* | 8/2006 | Vanamamalai | H04L 12/16 |
| | | | 370/241 |
| 2007/0300240 A1 | 12/2007 | Johannes | |
| 2008/0026312 A1 | 1/2008 | Kamiyoshi | |
| 2008/0028086 A1 | 1/2008 | Chetuparambil | |
| 2008/0046890 A1* | 2/2008 | Dunlap | G06F 9/5088 |
| | | | 718/104 |
| 2009/0240664 A1 | 9/2009 | Dinker | |
| 2009/0259736 A1 | 10/2009 | Chang | |
| 2010/0250648 A1 | 9/2010 | Cao | |
| 2011/0099233 A1* | 4/2011 | Calder | G06F 9/546 |
| | | | 709/206 |
| 2011/0208876 A1 | 8/2011 | Richardson | |
| 2011/0296512 A1 | 12/2011 | Dietrich | |
| 2011/0307886 A1* | 12/2011 | Thanga | G06F 9/5077 |
| | | | 718/1 |
| 2012/0047239 A1* | 2/2012 | Donahue | G06F 9/5072 |
| | | | 709/220 |
| 2013/0007376 A1* | 1/2013 | Kottapalli | G06F 12/0833 |
| | | | 711/146 |
| 2013/0138724 A1* | 5/2013 | Lim | H04L 67/303 |
| | | | 709/203 |
| 2013/0198154 A1* | 8/2013 | Welborn | G06F 16/21 |
| | | | 707/E17.005 |
| 2014/0019985 A1 | 1/2014 | Krajec | |
| 2014/0372550 A1 | 12/2014 | Said | |
| 2015/0222548 A1 | 8/2015 | Krajec | |
| 2015/0278243 A1* | 10/2015 | Vincent | G06F 16/182 |
| | | | 707/634 |
| 2015/0278397 A1* | 10/2015 | Hendrickson | G06F 16/9024 |
| | | | 707/798 |
| 2015/0280959 A1* | 10/2015 | Vincent | G06F 3/0622 |
| | | | 709/203 |
| 2016/0007951 A1 | 1/2016 | Haugaard | |
| 2016/0070589 A1* | 3/2016 | Vermeulen | G06F 9/466 |
| | | | 711/153 |
| 2016/0070593 A1 | 3/2016 | Harris | |
| 2016/0077951 A1 | 3/2016 | Krajec | |
| 2016/0191363 A1 | 6/2016 | Haraszti | |
| 2017/0286268 A1 | 10/2017 | Lincoln | |
| 2018/0039671 A1 | 2/2018 | Yang | |
| 2018/0225575 A1 | 8/2018 | Sun | |
| 2018/0278675 A1 | 9/2018 | Thayer | |
| 2019/0179944 A1 | 6/2019 | Ungar | |
| 2020/0050694 A1 | 2/2020 | Avalani | |
| 2020/0076817 A1 | 3/2020 | Gupta | |
| 2020/0081739 A1 | 3/2020 | Millwood | |
| 2020/0272670 A1 | 8/2020 | Vaishnavi | |
| 2020/0336553 A1 | 10/2020 | Yeddula | |
| 2021/0157661 A1* | 5/2021 | Ross | G06F 9/5005 |

OTHER PUBLICATIONS

Belkin et al., "Combining the evidence of multiple query representations for information retrieval", ScienceDirect, vol. 31, Issue 3, May-Jun. 1995, 3 pages.

Cloud Foundry, "HTTP Routing", Cloud Foundry Docs, https://docs.cloudfoundry.org/concepts/htip-routing.html, 7 pages, accessed Nov. 18, 2019.

Datadog, "Getting started with tags," Datasheet [online], Datadoghq.com, [accessed on Dec. 18, 2020], 3 pages, Retrieved from the Internet: <URL: https://docs.datadoghq.com/getting_started/tagging/>.

HTT Routing, Cloud Foundry, Datasheet [online], Oct. 1, 2020 [accessed on Oct. 15, 2020], 6 pages, Retrieved from the Internet: <URL: https://docs.cloudfoundry.org/concepts/http-routing.html>.

Mell, et al., "The NIST Definition of Cloud Computing", National Institute of Standards and Technology, Special Publication 800-145, Sep. 2011, 7 pages.

Opentracing, "Instrumenting frameworks," Datasheet [online], opentracing.com, [accessed on Dec. 18, 2020], 10 pages, Retrieved from the Internet: <URL: https://opentracing.io/docs/best-practices/instrumenting-frameworks/#finish-the-span>.

Ross, et al., "Controlling Interaction With a Scalable Application," Application and Drawings, Filed on Nov. 23, 2020, 29 Pages, Related PCT Patent Application Serial No. 162020/061039.

Ross, et al., "Controlling Interaction With a Scalable Application," Application and Drawings, Filed on Nov. 26, 2019, 33 Pages, U.S. Appl. No. 16/696,300.

Vo, et al., "LogBase: A Scalable Log-structured Database System in the Cloud", Aug. 27-31, 2012, Istanbul, Turkey, Proceedings of the VLDB Endowment, vol. 5, No. 10, pp. 1004-1015.

IBM: List of IBM Patents or Patent Applications Treated as Related (Appendix P), Sep. 24, 2021, 2 pages.

Pending U.S. Appl. No. 17/448,781, entitled "Configuring Application Instances On Scaling", filed Sep. 24, 2021, 44 Pages.

International Searching Authority, "Notification of Transmittal of the International Search Report and the Written Opinion of the International Searching Authority, or Declaration," Patent Cooperation Treaty, Date, 11 pages, International Application No. PCT/EP2021/083051.

Undisclosed Author, "adjust/gor" GitHub [datasheet], [accessed on Feb. 16, 2022], Retrieved from the Internet: <URL: https://github.com/adjust/gor>.

* cited by examiner

COORDINATING REQUESTS ACTIONED AT A SCALABLE APPLICATION

BACKGROUND

The present invention relates generally to the field of computing, and more particularly to requests actioned at a scalable application, and more specifically, to coordinating requests actioned at multiple application instances.

Cloud computing may include platform as a service (PaaS) which may provide a capability to the consumer to deploy onto a cloud infrastructure consumer-created or acquired applications. Cloud providers deliver a computing platform, typically including an operating system, programming language execution environment, database, and web server. Application developers may develop and run their software on the cloud platform and the underlying computer and storage resources may scale automatically to match application demand.

Some cloud platforms may allow applications to be scaled by providing multiple instances (i.e. replicas) of an application to be deployed. A workload balancer may sit in front of the multiple application instances to balance work between the application instances. The workload balancer may round-robin traffic between the application instances and this works well for a runtime workload. Some cloud platforms may provide an ability to send client requests to a specific instance of an application or to round-robin.

For some command requests, such as collecting trace, such round-robin may not be ideal as the command could just go to just one of the application instances. Therefore, in such situations a command request may be actioned on multiple application instances.

When collecting trace, there may be an option to only collect trace until a certain end event is seen. This may be advantageous as it may limit the amount of trace collected and associated overheads, which may make diagnostics easier. If the trace is being actioned on multiple application instances, each instance may continue until an end event is seen in that instance which may result in increased trace data being collected and associated high overheads of collecting trace data.

SUMMARY

Embodiments of the present invention disclose a method, computer system, and a computer program product for coordinating requests actioned at a scalable application. The present invention may include registering metadata regarding response behavior to be applied when actioning a client request to multiple application instances. The present invention may include augmenting a client request according to the metadata to provide augmented request instances to coordinate completion on a required number of response instances from the application instances to which the augmented request instances are routed. The present invention may include coordinating a status of the client request across the application instances to terminate outstanding augmented request instances when a required number of completed instances is received.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
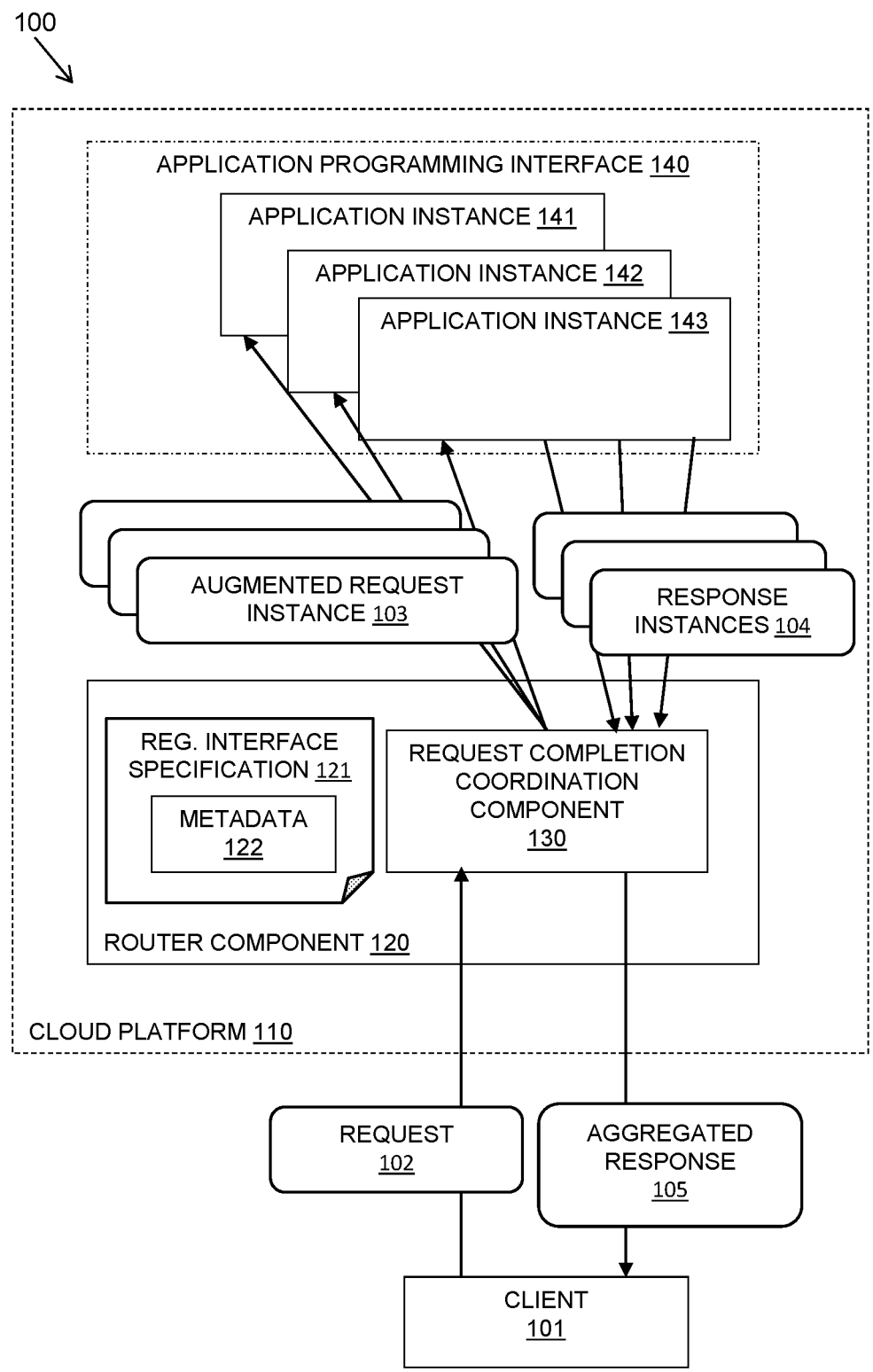
FIG. 1 is a schematic diagram of a system according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for coordinating requests actioned at a scalable application. As such, the present embodiment has the capacity to improve the technical field of managing and diagnosing applications in a scalable cloud environment by providing a mechanism by which completion of requests or actions that have been sprayed out to multiple instances of an application can be coordinated between the instances. More specifically, the present invention may include registering metadata regarding response behavior to be applied when actioning a client request to multiple application instances. The present invention may include augmenting a client request according to the metadata to provide augmented request instances to coordinate completion on a required number of response instances from the application instances to which the augmented request instances are routed. The present invention may include coordinating a status of the client request across the application instances to terminate outstanding augmented request instances when a required number of completed instances is received.

As described previously, cloud computing may include platform as a service (PaaS) which may provide a capability to the consumer to deploy onto a cloud infrastructure consumer-created or acquired applications. Cloud providers deliver a computing platform, typically including an operating system, programming language execution environment, database, and web server. Application developers may develop and run their software on the cloud platform and the underlying computer and storage resources may scale automatically to match application demand.

Some cloud platforms may allow applications to be scaled by providing multiple instances (i.e. replicas) of an application to be deployed. A workload balancer may sit in front of the multiple application instances to balance work between the application instances. The workload balancer may round-robin traffic between the application instances and this works well for a runtime workload. Some cloud platforms may provide an ability to send client requests to a specific instance of an application or to round-robin.

For some command requests, such as collecting trace, such round-robin may not be ideal as the command could just go to just one of the application instances. Therefore, in such situations a command request may be actioned on multiple application instances.

When collecting trace, there may be an option to only collect trace until a certain end event is seen. This may be advantageous as it may limit the amount of trace collected and associated overheads, which may make diagnostics easier. If the trace is being actioned on multiple application instances, each instance may continue until an end event is seen in that instance which may result in increased trace data being collected and associated high overheads of collecting trace data.

Therefore, it may be advantageous to, among other things, register metadata regarding response behavior to be applied when actioning a client request to multiple application instances, augment a client request according to the metadata to provide augmented request instances to coordinate completion of a required number of response instances from the application instances of which the augmented request instances are routed, and coordinate a status of the client request across the application instances to terminate outstanding augmented request instances when a required number of completed instances is received.

According to at least one embodiment, the present invention may improve the terminating of request instances at application instances that do not need to be completed due to a response being available from one or more other application instances. The client request may be a command to be performed on the application instances.

According to at least one embodiment, the present invention may improve user experience and may improve the ability to manage applications in a scalable cloud environment.

According to at least one embodiment, the present invention may improve the managing of application in a scalable cloud environment by reducing resource usage in terms of processor, memory, and response time.

According to at least one embodiment of the present invention, augmenting a client request according to the metadata may include adding response coordination instructions in a header of a request instance. Coordinating a status of the client request across the application instances may provide an endpoint check for receiving an update on a completed request instance and for request instances to check if other request instances have completed. In one embodiment, the endpoint check is provided by a callback mechanism in which application instances provide updates to the endpoint when a response instance is completed. In another embodiment, the endpoint check is provided by an event registration mechanism in which application instances register for an event of a completed request instance.

According to at least one embodiment of the present invention, the method may include routing the augmented request instances to multiple application instances based on the registered metadata. The augmented request instances may be routed to all application instances and a required number of completed response instances may be a single response instance.

According to at least one embodiment of the present invention, the method may be carried out at a router component in front of a scalable application capable of multiple application instances located in a scalable cloud environment.

According to at least one embodiment of the present invention, the method may include combining multiple response instances from the application instances to form an aggregate response based on the registered metadata, with the aggregated response including one or more completed response instances and any terminated response instances. This may include waiting for response instances from all request instances and combining the one or more response instances to form an aggregate response. Alternatively, the method may send a response to the client request when the required number of response instances have been received without waiting for the termination of the other request instances.

According to at least one embodiment of the present invention, registering metadata may include registering an interface specification to an application including metadata specifying rules regarding completion of response instances and a required number of completed response instances. Registering an interface specification to an application may include creating the metadata regarding response behavior according to requirements associated with a type of request; and associating the created metadata with the interface specification.

According to at least one embodiment of the present invention, there may be a computer-implemented method for coordinating requests actioned at a scalable application, the method comprising: receiving a client request to be routed to multiple application instances; augmenting instances of the client request according to registered metadata to coordinate completion of a required number of response instances from the application instances to which the augmented request instances are routed; and coordinating a status of the request across the application instances to terminate outstanding request instances when a required number of completed response instances is received.

According to at least one embodiment of the present invention, there may be a system for coordinating requests actioned at a scalable application, comprising: a processor and a memory configured to provide computer program instructions to the processor to execute the function of the components: a registration component for registering metadata regarding response behavior when actioning a request to multiple application instances; a request instance augmenting component for augmenting a client request according to the metadata to provide augmented request instances to coordinate completion of a required number of response instances from the application instances to which the augmented request instances are routed; and a request instance coordinating component for coordinating a status of the client request to terminate outstanding augmented request instances when a required number of completed response instances is received.

According to at least one embodiment of the present invention, the system may include a specification inspection component for inspecting registered metadata in an interface specification including metadata specifying rules regarding completion of response instances and a required number of completed response instances.

According to at least one embodiment of the present invention, the system may include an aggregating component for combining multiple response instances from the application instances to form an aggregate response based on the registered metadata, including completed response instances and terminated response instances.

According to at least one embodiment of the present invention, the request instance coordinating component may provide an endpoint check for update of a completed request instance and for request instances to check if other request instances have completed. The completion coordinating component may include a callback mechanism component or an event registration component.

According to at least one embodiment of the present invention, the system may include a request instance routing component including: analyzing the registered metadata for the application; identifying routing metadata; and routing the augmented request instances to the application instances based on the identified routing metadata. The system may be a router component in front of multiple application instances that may be in a scalable cloud environment.

According to at least one embodiment of the present invention, there may be a system provided for coordinating requests actioned at a scalable application having multiple application instances, comprising: a processor and a memory configured to provide computer program instructions to the processor to execute the function of the components: a request receiving component for receiving a client request to be routed to multiple application instances; a request instance augmenting component for augmenting instances of the request according to registered metadata to coordinate completion of a required number of response instances from application instances to which the augmented request instances routed; and a request instance coordination component for coordinating a status of the client request across the application instances to terminate outstanding request instances when a required number of completed response instances is received.

According to at least one embodiment of the present invention there may be a computer program product provided for coordinating requests actioned at a scalable application, the computer program product comprising a computer readable storage medium having program instructions embodied therewith, the program instructions executable by a processor to cause the processor to: register metadata regarding response behavior to be applied when actioning a request to multiple application instances; augment a client request according to the metadata to provide augmented request instances to coordinate completion of a required number of response instances from application instances to which the augmented request instances are routed; and coordinate a status of the client request across the application instances to terminate outstanding augmented request instances when a required number of completed response instances is received.

According to at least one embodiment of the present invention, the computer readable storage medium may be a non-transitory computer readable storage medium and the computer readable program code may be executable by a processing circuit.

Concepts for controlling interaction with a scalable application are proposed. Scalability in the context of cloud computing may be regarded as the ability to handle growing or diminishing resources to meet traffic demands in a capable way. In essence, scalability may provide a level of capacity that can grow or shrink as required. A scalable application may have multiple application instances in the form of replicas of the application which can each carry out the function of the application. The application instances may be provided across cloud resources including across different cloud service providers in a multi-cloud or hybrid cloud solution.

Commands in the form of Hypertext Transfer Protocol (HTTP) requests (i.e. a packet of information that one computer sends to another computer to communicate) may be routed to only one of the application instances or multiple application instances. The number of application instances may vary, and a scalable application may have a single application instance or multiple application instances at any point in time.

The described method and system provide a mechanism by which completion of requests or actions that have been sprayed out to multiple application instances can be coordinated between the application instances. The method and system are provided at a router component provided between client commands and application instances that may be provided as part of, hosted by or associated with a cloud platform.

Referring to FIG. 1, a schematic diagram shows an example embodiment of a system 100 in which the described method may be implemented. It should be appreciated that FIG. 1 provides only an illustration of one implementation and does not imply any limitations with regard to the environments in which different embodiments may be implemented. Many modifications to the depicted environments may be made based on design and implementation requirements.

A cloud platform 110 is shown which provides a platform to develop, run, or manage applications. The cloud platform 110 may be any form of cloud platform providing routing and scaling capabilities including a multi-cloud platform, hybrid-cloud platform, etc., and may enable microservice architectures an application or a component of an application may be deployed and scaled independently from the rest of the system.

An application programming interface (API) 140 defines a set of specifications including Hypertext Transfer Protocol (HTTP) request messages and definitions of response messages for an application deployed on the platform 110. For scalability, an API 140 may support multiple application instances 141-143, for example, that may be provided on different servers of the cloud platform 110.

The API 140 may consist of one or more publicly exposed endpoints to a defined request-response message system. A client 101 may issue command requests to the API 140 relating to the development, running, or managing of the application. For example, these may be HTTP requests, for example, such as Representational state transfer (REST) API requests or Simple Object Access Protocol (SOAP) requests.

The cloud platform 110 may include a router component 120 for routing client requests 102 from a client 101 to the API 140. The router component 120 may have access to an interface specification 121 for the API 140 registered at or accessible to the router component 120. The router component 120 may be provided in a similar implementation to a workload balancer for balancing a workload between application instances. The described router component 120 may include additional functionality of a request completion coordination component 130 that may be implemented in an existing form of router component 120.

The described method and system provide the request completion coordination component 130 at a router component 120 for coordinating a request 102 that may be sent to an API 140 where the request may be actioned on multiple application instances 141-143. The request completion coordination component 130 may provide a mechanism by which completion of request instances of a client request that have been sprayed out to multiple application instances may be coordinated.

In accordance with the described method, the interface specification 121 may include metadata 122 regarding response behavior to be implemented when actioning a client request 102 as one or more request instances to application instances. The metadata 122 may include a required routing to a number of application instances and a required number of completed response instances to be received from the one or more application instances.

The request 102 may be augmented at the router component 120 to include completion coordination instructions to result in augmented request instances 103 that may be forwarded to a number of the application instances 141-143 as specified in the metadata 122. Response instances 104 to the augmented request instances 103 may be received at the request coordination component 130 and their completion coordinated in accordance with the coordination specified in the metadata. An aggregated response 105 may be sent back to the client 101 compiling the response instances 104 from the application instances 141-143.

In one implementation of this functionality, a client request 102 may be actioned by all application instances 141-143 with one completed response instance 104 to the request required such that other request instances 103 can terminate without completing the request. This may be implemented by a coordination mechanism such as a callback mechanism or an event registration mechanism as described further below.

Figure 2:
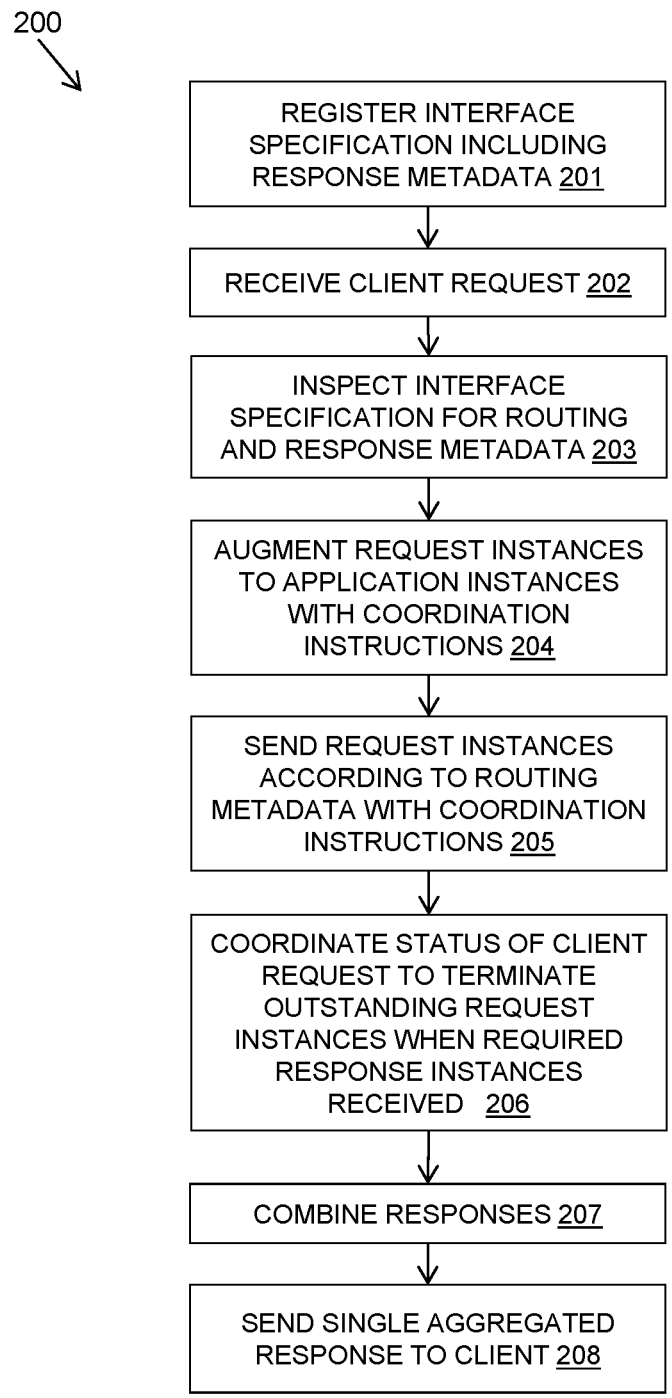
FIG. 2 is an operational flowchart illustrating a process for coordinating requests actioned at a scalable application according to at least one embodiment.

Referring now to FIG. 2, an operational flowchart illustrating the exemplary coordinating requests actioned at a scalable application process 200 according to at least one embodiment is depicted. The described method may be carried out as follows at router component 120 provided in front of multiple application instances 141-143 which may be located in a scalable cloud environment.

The method may register metadata regarding response behavior when actioning a request to multiple application instances. The metadata may be registered by registering 201 an interface specification to an application that includes metadata relating to the routing of requests to multiple application instances, specifying a required number of completed response instances, and rules regarding completion of response instances. Registering 201 an interface specification to an application may include creating the metadata according to requirements associated with a type of request and associating the created metadata with the interface specification.

The metadata may be annotations on the interface specification that are either created manually by a user or generated automatically using a machine-learning algorithm. A developer or engineer may create the interface specification including the metadata annotations. Metadata may be incorporated based on the type of expected request (PUT, GET, POST, etc.) or a basic set of metadata may be included if expected requests are not known. The metadata may provide an indication that the routing (i.e. the coordination/management) of a request and/or a response should be treated differently or in a particular manner. For instance, for the case of a command (i.e. a request) to enable tracing of an application, the annotations providing the metadata indicate that the request should be sent to all application instances, rather than just one instance and that one completed response is required and a rule may be specified as to what constitutes a completed response.

The interface specification may be registered with the platform technology on deployment and may be accessible to a router component in front of the application instances. In this way, the requests may be distributed by the router component to each of the corresponding application instances outlined by the interface specification.

The interface specification may also be referred to as an interface document, API (application programming interface) document, or UI (user interface) specification, and may include a specification or description for the application adhering to a standardized framework. The interface specification for the application may include instructions relating to an interaction and/or integration with an application interface associated with the application. The interface specification may capture the details of the software user interface into a written document and cover all possible actions that an end user may perform via the application, as well as all visual, auditory and other interaction elements in the application. The interface specification may thus be the main source of implementation/integration information for how the application should work. Beyond implementation, the interface specification may consider usability, localization, and demo limits. In general, the goal of a requirement specification may be to describe what a product (i.e. an application) is capable of, whereas the interface specification may detail how these requirements are implemented in practice.

For example, the interface specification 121 may be a Swagger® document in the form of a specification for machine-readable interface files for describing, producing, consuming, and visualizing RESTful (representational state transfer) web services (i.e. applications), and documenting RESTful API. Swagger® is a registered trademark of Nutra-Click, LLC. Representational state transfer is a software architectural style that defines a set of constraints to be used for creating web services. Web services that conform to the REST architectural style (i.e. RESTful web services) provide interoperability between computer systems on the Internet. A RESTful API is an application programming interface that uses HTTP requests to enable two or more applications to communicate with each other.

Once an interface specification 121 is registered 201, the method may receive 202 a client request. The request may include a command to be performed on the application instances. These may be Hypertext Transfer Protocol (HTTP) requests. Examples of the command include, but are not limited to, a command to identify and/or resolve errors in the application instances (e.g. TRACE HTTP request), a command to receive a status notification comprising a status of the application instances (e.g. STATUS HTTP request), a command to retrieve information from the instance of the application (e.g. GET HTTP request), a command to send data to the application, for example customer information, file upload, etc. (e.g. POST HTTP request), a command to remove predefined information (e.g. DELETE HTTP request), a command to establish a communication flow with the application (e.g. CONNECT HTTP request), a command to describe the communication options for the application (e.g. OPTIONS HTTP request).

Proposed embodiments may employ a concept of invoking requests over RESTful interfaces to be routed to and completed by all instances (or a selection of the instances) of an application. How the commands are invoked may be based on metadata associated with an interface specification for the application.

The method may inspect 203 the interface specification for the received request to determine the instructions regarding routing and coordinating responses of the request. If the metadata indicates that request instances are to be sent to multiple application instances (either all instances or a subset of the instances) and that response instances are only required from less than all the application instances that the request is to be sent to, then the request is augmented 204 to produce augmented request instances that include instructions to coordinate the termination of request instances that do not need to complete.

The method may augment 204 multiple request instances that are to be sent to the multiple application instances. Each request instance may be augmented 204 to provide instructions to coordinate completion of a required number of responses from application instances to which the request is routed. For example, the instruction may be included in the header of the request instances.

The augmented request instances may be sent 205 according to the routing metadata to the application instances.

The method coordinates 206 a status of the request including all the request instances across the application instances to terminate outstanding request instances when a required number of completed response instances is received. This reduces the use of resources and delays in responding to the client that would occur if each request instance must complete.

The coordination may provide an endpoint check for receiving an update to on completion by a request instance and for request instances to check if other request instances have completed. The application instance may carry out the endpoint check or the coordination component may register when it receives an appropriate response instance. The endpoint check may be provided by a callback mechanism, by an event registration mechanism, or other method that enables the coordination between the request instances.

The method may wait for all responses from the request instances sent to the application instances in order to combine 207 the responses together including completed responses and terminated responses in order to send 208 a single aggregated response to the client. Alternatively, the method may send a first response from a request instance or a designated number of request instances back to the client as soon as it or they are received without waiting for the responses from the other request instances. This may enable a completed request response to be sent as quickly as possible.

Whether or not to combine 207 the multiple instances from the application instances to form an aggregate response may be specified in the registered metadata.

Figure 3:
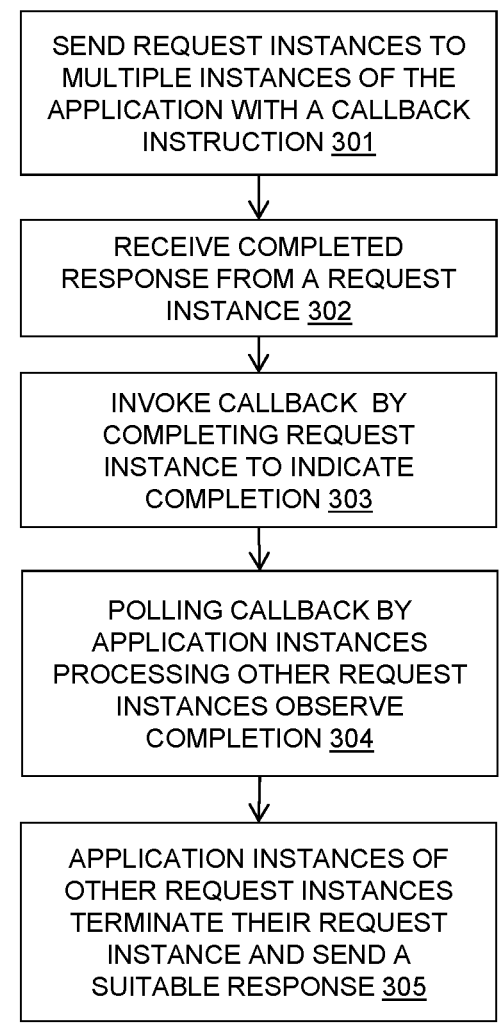
FIG. 3 is an operational flowchart illustrating a process for coordinating completion of multiple request instances according to at least one embodiment.

Referring now to FIG. 3, an operational flowchart illustrating the exemplary coordinating completion of multiple request instances process 300 of a callback mechanism according to at least one embodiment is depicted.

The multiple request instances may be sent 301 to multiple application instances with a callback instruction. The callback provided on the request instances coordinates when one application instance has completed the request so that the others can stop. The request instances may be sent 301 to all the application instances or a subset of the instances according to the metadata of the interface specification.

A completed response may be received 302 from one of the request instances sent to one of the application instances. The request instance may invoke 303 the callback augmented to the request instance to indicate it has completed.

The remaining application instances processing the request instances may observe 304 the completion when the application instances poll the callback for status as part of the processing of the request instances. The remaining application instances processing the remaining request instances therefore terminate 305 the processing of their request instance and send a suitable response.

The following example demonstrates how an example implementation of the described method may work in a trace request.

An application is deployed to a cloud platform, with three application instances (replicas), and has an associated API specification in a predefined location and is registered with a router component of the cloud platform. The API specification includes routing metadata to indicate requests should be fanned out to all instances and response metadata that the request only needs to be actioned by one instance (required: 1) and that the responses should be aggregated. The response metadata may also include a rule of how to aggregate the data. For example, rule "200 if at least one 200 response, else most common", meaning if there was at least one response code of 200 from the response instances then the response code of the aggregated response should be 200, otherwise, if there are no 200 response codes the most common response code (i.e. 503) may be used.

The metadata for the trace request may include the following:

```
paths:
  /v1/startTrace
    post:
      operationId: "startTrace"
      description: "Instruct the server to start tracing"
      routing:
        request: "all-instances"
      response:
        type: "aggregate"
        rules: "200 if at least one 200 response,
        else most common"
        required: 1
      responses:
        200:
          description: "OK"
        503:
          description: "Unavailable"
```

An issue is identified causing an exception to be thrown and a trace is required. A user issues a command via the REST API to start a trace and stop when the exception may be observed.

The request goes to the router component where the API specification may be inspected and, instead of just routing to one instance of the application, the request may be routed to all application instances as the metadata requires, i.e. request: "all-instances".

A callback may be provided on the request instances in order to coordinate when one application instance has completed the request instance so that the others can stop.

Each application instance receives a request instance and starts to trace. Of the three application instances, the second one records the exception and sends a defined response instance. The second application instance invokes the callback augmented to the request instance by the router to indicate it has completed.

The remaining first and third application instances are polling the callback for status and they observe the completion from the second application instance and stop tracing, sending suitable response instances.

The router component waits for responses from all application instances the request was routed to, then aggregates them all into a single response to the client application as required by the metadata. For example, "HTTP Status Code: 200 [{"BIP3001 not observed on server instance 0001"}, {"BIP3001 observed on server instance 0002"}, {"BIP3001 not observed on server instance 0003"}].

This provides tracing to be started on all application instances and all application instances stopping tracing when one has observed the error. When the user retrieves the trace logs, they have captured the event and been efficient in resource usage.

In another embodiment, an implementation may choose an event registration mechanism instead of a callback mechanism for coordination of the request instances.

In an event registration mechanism, an application instance may send a "registration" request to a given endpoint for particular "events". Typically, the application instance would then have "handlers" to handle different types of event (i.e. onMessage( ) or onError( ) functions) that would be executed when that particular event type is fired. In this case, when a request instance has been completed successfully, the application instance that completed the request instance may tell the endpoint or the coordinator 130. This will then cause an "event" to be triggered that would notify the other application instances and their onMessage( ) function would be fired with a message indicating the first application instance has completed. The application instances would then take appropriate action.

Figure 4:
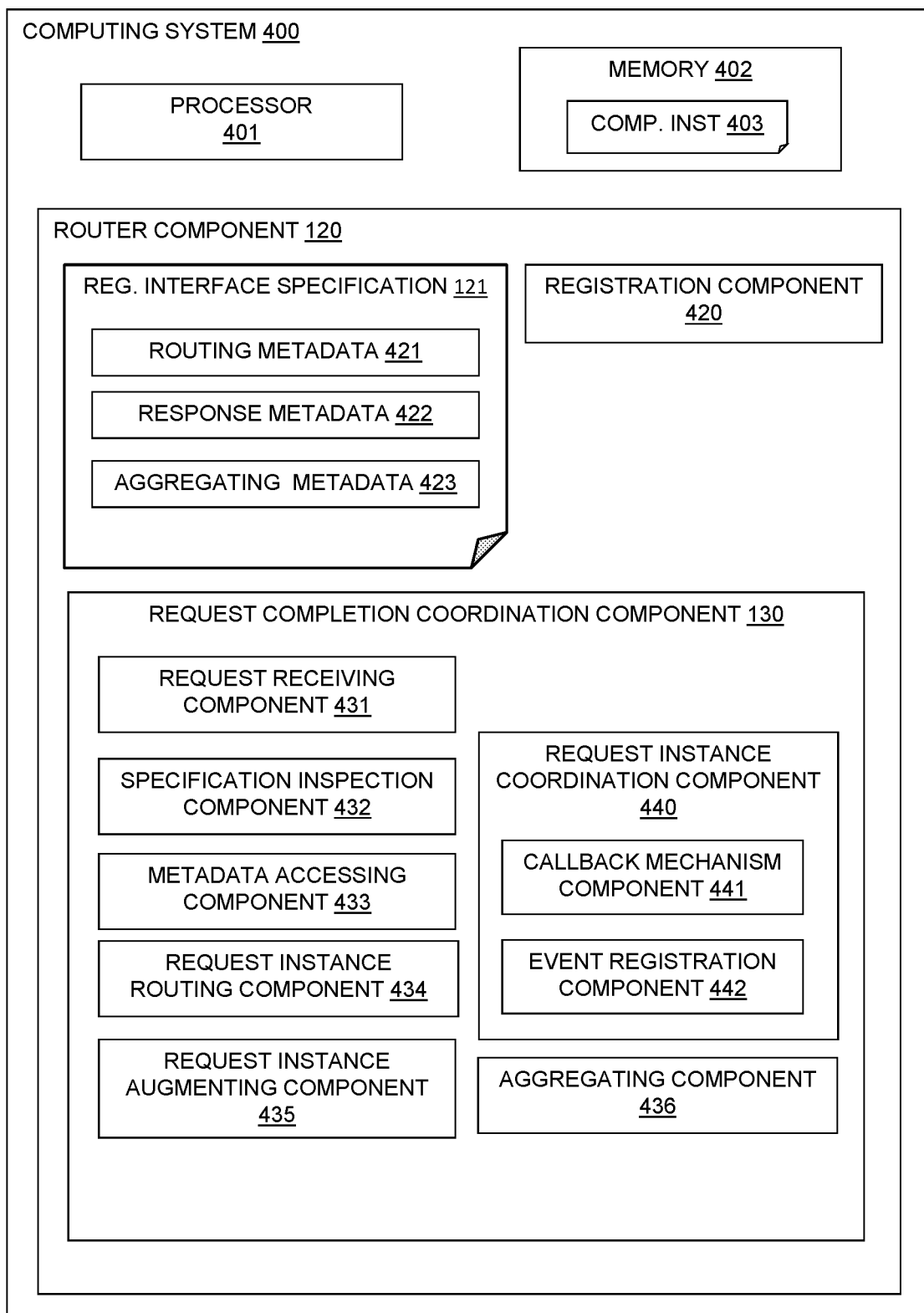
FIG. 4 is a block diagram of a system depicted according to at least one embodiment.

Referring now to FIG. 4, is a block diagram of a system depicted according to at least one embodiment. The block diagram shows an embodiment of a router component 120 depicted in FIG. 1 provided in associated with a scalable cloud environment. The router component 120 may be provided on a computing system 400 that includes at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The router component 120 includes a registration component 420 for registering an interface specification 121 including metadata regarding response behavior when actioning a request to multiple application instances. Metadata provided by the interface specification 121 includes routing metadata 421 relating to the routing behavior required for a request, such as a number of application instances to which the request should be sent. Metadata provided by the interface specification 121 also includes response metadata 422 including rules regarding completion of response instances and a required number of completed response instances. Metadata provided by the interface specification 121 may also include aggregating metadata 423 specifying the reporting behavior of responses to a request.

The router component 120 may include a request completion coordination component 130 for coordinating request instances of a request that are sent to multiple application instances for action.

The request completion coordination component 130 may include a request receiving component 431 for receiving a request for routing to application instances and a specification inspection component 432 for inspecting metadata in a registered interface specification 121 for a request. A metadata accessing component 433 may access registered metadata including routing metadata 421, response metadata 422, and aggregating metadata 423 for a request.

The request completion coordination component 130 may include a request instance routing component 434 for routing instances of the request to multiple application instances in accordance with the routing metadata 421 and a request instance augmenting component 435 for augmenting each request instance according to the response metadata 422 to include instructions to coordinate completion of a required number of response instances from application instances to which request instances are routed.

The request completion coordination component 130 may include a request instance coordination component 440 for coordinating a status of the request across the application instances to terminate outstanding instances of the request when a required number of completed responses is received. The completion coordinating component 440 provides an endpoint check for a completed request instance to send an update to on completion and for request instances to check if other request instances have completed. The completion coordinating component 440 may include a callback mechanism component 441 or an event registration component 442.

The request completion coordination component 130 may include an aggregating component 436 for combining multiple responses instances from the application instances to form an aggregate response based on the registered aggregating metadata 423 for the request. The aggregated response may include completed responses and terminated responses.

Figure 5:
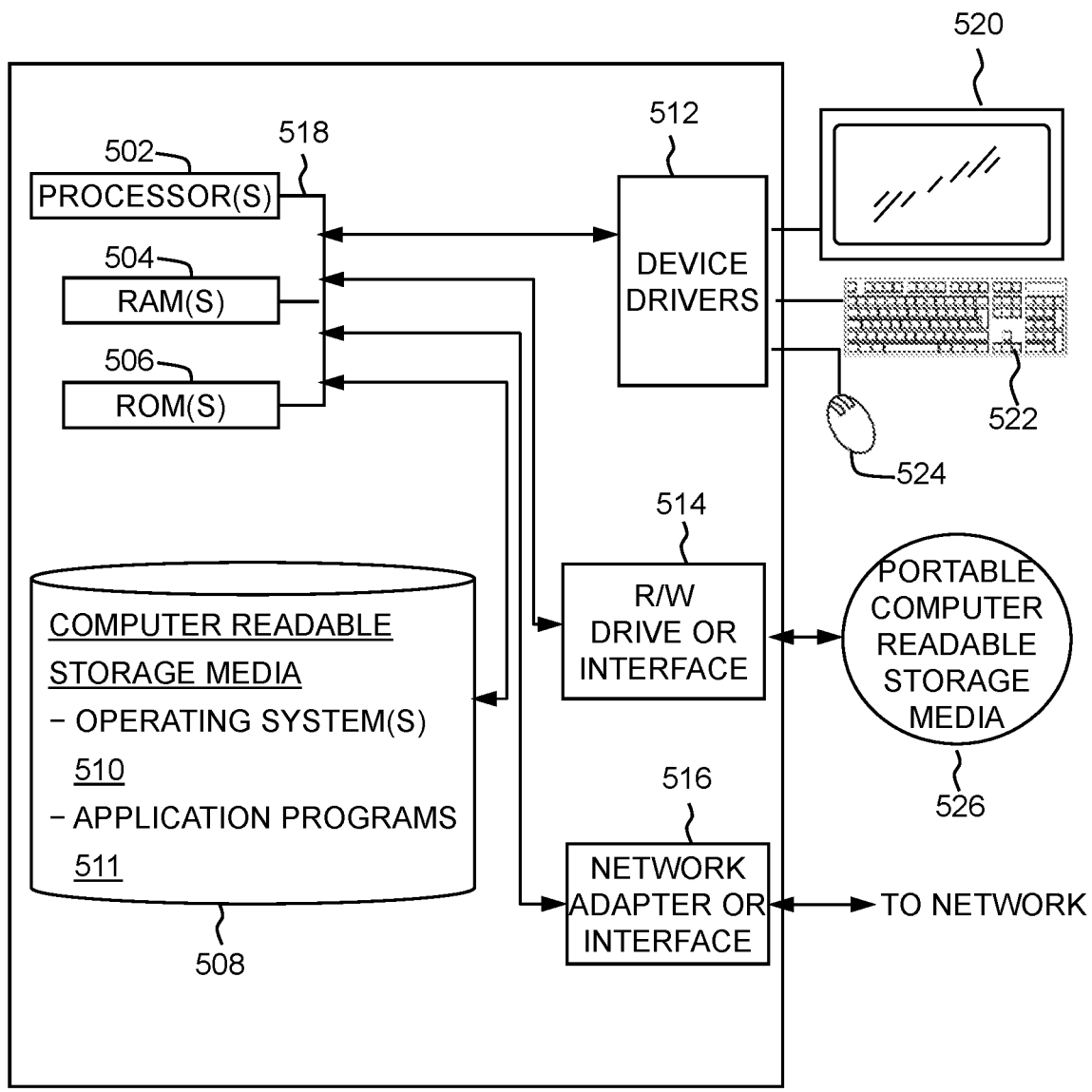
FIG. 5 is a block diagram of internal and external components of computers depicted in FIG. 1 according to at least one embodiment.

FIG. 5 depicts a block diagram of components of a computing system as used for the system depicted in FIG. 1 of the router component 120 in the cloud platform 110, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

The computing system may include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the router component 120 and request completion coordination component 130 are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system may also include a R/W drive or interface 514 to read from and write to one or more portable computer readable storage media 526. Application programs 511 on the computing system can be stored on one or more of the portable computer readable storage media 526, read via the respective R/W drive or interface 514 and loaded into the respective computer readable storage media 508.

The computing system may also include a network adapter or interface 516, such as a TCP/IP adapter card or wireless communication adapter. Application programs 511 on the computing system can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

The computing system may also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, RAY drive or interface 514, and network adapter or interface 516 may comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
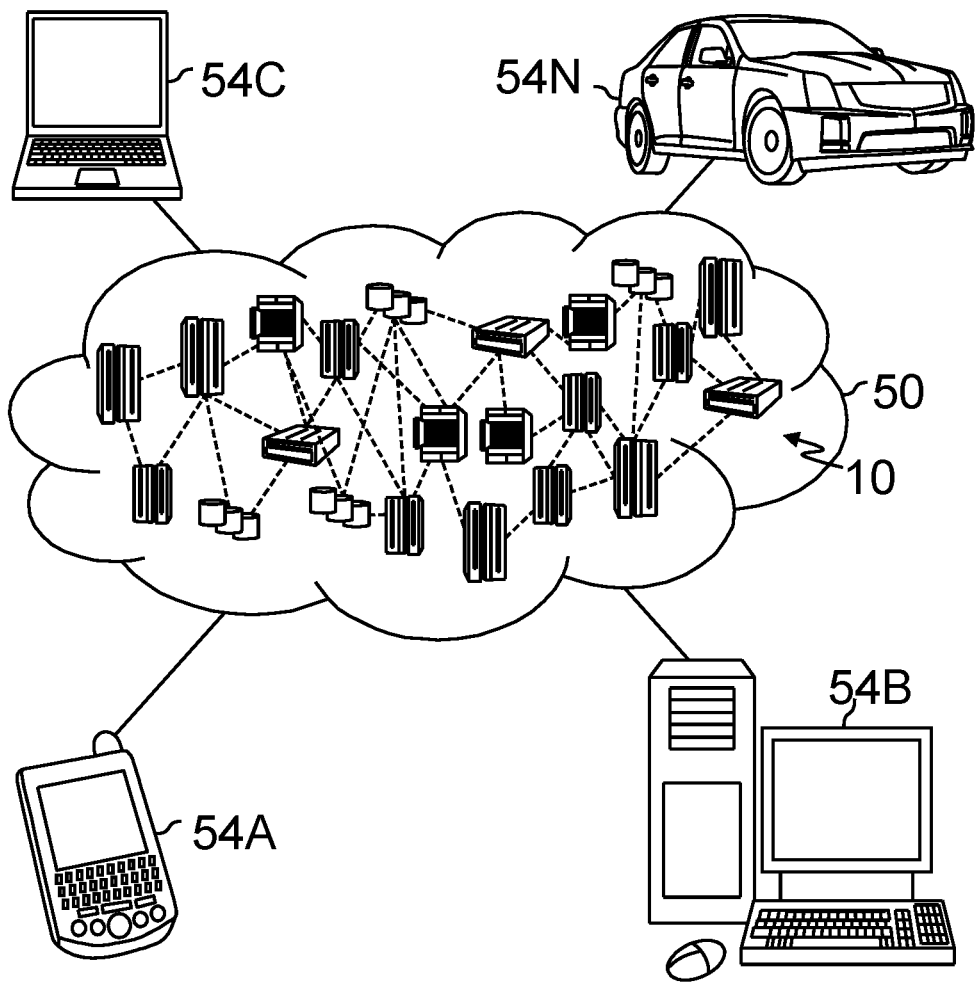
FIG. 6 is a block diagram of an illustrative cloud computing environment including the system depicted in FIG. 1, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
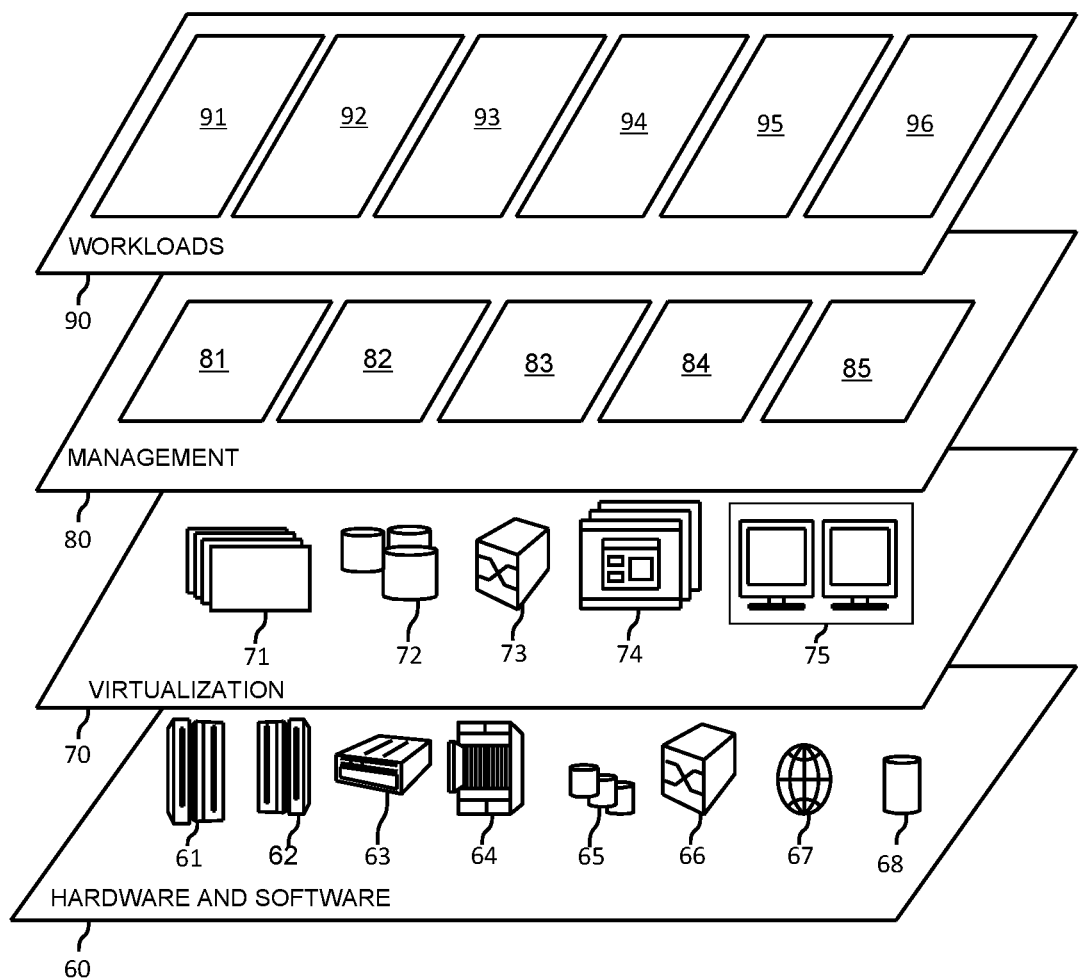
FIG. 7 is a block diagram of functional layers of the illustrative cloud computing environment of FIG. 6, in accordance with an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 may include hardware and software components. Examples of hardware components may include: mainframes 61; RISC (Reduced Instruction Set Computer) architecture based servers 62; servers 63; blade servers 64; storage devices 65; and networks and networking components 66. In some embodiments, software components may include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and request routing processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method for coordinating requests actioned at a scalable application, the method comprising:
   registering metadata regarding response behavior to be applied when actioning a client request to one or more application instances;
   augmenting the client request according to the registered metadata to provide augmented request instances to coordinate completion of a required number of response instances from the one or more application instances;
   coordinating a status of the client request across the one or more application instances to terminate outstanding augmented request instances when a required number of completed response instances is received;
   waiting for the response instances from the augmented request instances; and
   combining multiple response instances from the one or more application instances to form an aggregate response based on the registered metadata, including one or more completed response instances and any terminated response instances.

2. The method of claim 1, wherein augmenting the client request according to the registered metadata includes adding response coordination instructions in a header of the augmented request instance.

3. The method of claim 1, wherein coordinating the status of the client request across the one or more application instances provides an endpoint check for receiving an update on a completed request instance and for request instances to check if other request instances have completed.

4. The method of claim 3, wherein the endpoint check is provided by a callback mechanism in which the one or more application instances provide updates to the endpoint when the response instance is completed.

5. The method of claim 3, wherein the endpoint check is provided by an event registration mechanism in which the one or more application instances register for an event of the completed request instance.

6. A computer system for coordinating requests at a scalable application, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
registering metadata regarding response behavior to be applied when actioning a client request to one or more application instances;
augmenting the client request according to the registered metadata to provide augmented request instances to coordinate completion of a required number of response instances from the one or more application instances;
coordinating a status of the client request across the one or more application instances to terminate outstanding augmented request instances when a required number of completed response instances is received;
waiting for the response instances from the augmented request instances; and
combining multiple response instances from the one or more application instances to form an aggregate response based on the registered metadata, including one or more completed response instances and any terminated response instances.

7. The computer system of claim 6, wherein augmenting the client request according to the registered metadata includes adding response coordination instructions in a header of the augmented request instance.

8. The computer system of claim 6, wherein coordinating the status of the client request across the one or more application instances provides an endpoint check for receiving an update on a completed request instance and for request instances to check if other request instances have completed.

9. The computer system of claim 8, wherein the endpoint check is provided by a callback mechanism in which the one or more application instances provide updates to the endpoint when the response instance is completed.

10. The computer system of claim 8, wherein the endpoint check is provided by an event registration mechanism in which the one or more application instances register for an event of the completed request instance.

11. A computer program product for coordinating requests actioned at a scalable application, comprising:
one or more non-transitory computer-readable storage media and program instructions stored on at least one of the one or more tangible storage media, the program instructions executable by a processor to cause the processor to perform a method comprising:
registering metadata regarding response behavior to be applied when actioning a client request to one or more application instances;
augmenting the client request according to the registered metadata to provide augmented request instances to coordinate completion of a required number of response instances from the one or more application instances;
coordinating a status of the client request across the one or more application instances to terminate outstanding augmented request instances when a required number of completed response instances is received;
waiting for the response instances from the augmented request instances; and
combining multiple response instances from the one or more application instances to form an aggregate response based on the registered metadata, including one or more completed response instances and any terminated response instances.

12. The computer program product of claim 11, wherein augmenting the client request according to the registered metadata includes adding response coordination instructions in a header of the augmented request instance.

13. The computer program product of claim 11, wherein coordinating the status of the client request across the one or more application instances provides an endpoint check for receiving an update on a completed request instance and for request instances to check if other request instances have completed.

14. The computer program product of claim 13, wherein the endpoint check is provided by a callback mechanism in which the one or more application instances provide updates to the endpoint when the response instance is completed.

15. The computer program product of claim 13, wherein the endpoint check is provided by an event registration mechanism in which the one or more application instances register for an event of the completed request instance.

* * * * *